United States Patent
Wildenberg et al.

(10) Patent No.: US 11,019,772 B2
(45) Date of Patent: Jun. 1, 2021

(54) BALE WRAPPER APPARATUS AND METHOD OF WRAPPING AN AGRICULTURAL BALE

(71) Applicant: Kuhn-Geldrop BV, Geldrop (NL)

(72) Inventors: Leonardus Johannes van den Wildenberg, Budel (NL); Henricus Petrus Gerardus Bullens, Casteren (NL)

(73) Assignee: Kuhn-Geldrop BV, Geldrop (NL)

( * ) Notice: Subject to any disclaimer, the term of this patent is extended or adjusted under 35 U.S.C. 154(b) by 117 days.

(21) Appl. No.: 16/316,402

(22) PCT Filed: Jul. 4, 2017

(86) PCT No.: PCT/EP2017/066568
§ 371 (c)(1),
(2) Date: Jan. 9, 2019

(87) PCT Pub. No.: WO2018/011006
PCT Pub. Date: Jan. 18, 2018

(65) Prior Publication Data
US 2019/0239436 A1    Aug. 8, 2019

(30) Foreign Application Priority Data

Jul. 14, 2016  (GB) .................................... 1612267

(51) Int. Cl.
*A01F 15/07* (2006.01)
(52) U.S. Cl.
CPC ...... *A01F 15/071* (2013.01); *A01F 2015/076* (2013.01); *A01F 2015/0725* (2013.01)
(58) Field of Classification Search
CPC ............ A01F 15/071; A01F 2015/0725; A01F 2015/076; B65B 11/045; B65B 11/025
See application file for complete search history.

(56) References Cited

U.S. PATENT DOCUMENTS

| 4,302,920 A | * | 12/1981 | Lancaster | ............. | B65B 11/045 |
| | | | | | 264/288.4 |
| 4,387,548 A | * | 6/1983 | Lancaster | ............. | A01F 15/071 |
| | | | | | 53/399 |

(Continued)

FOREIGN PATENT DOCUMENTS

| EP | 0152960 A2 | * | 8/1985 | ........... | B65B 11/008 |
| EP | 2 156 728 A2 | | 2/2010 | | |

(Continued)

OTHER PUBLICATIONS

International Search Report dated Sep. 11, 2017 in PCT/EP2017/066568 filed Jul. 4, 2017.

*Primary Examiner* — Nathaniel C Chukwurah
*Assistant Examiner* — Lucas E. A. Palmer
(74) *Attorney, Agent, or Firm* — Oblon, McClelland, Maier & Neustadt, L.L.P.

(57) ABSTRACT

A bale wrapper apparatus includes a table for supporting the bale and rotating the bale about a first axis; a film dispenser including a film holder and a pre-stretcher unit; a drive device for driving relative rotation between the table and the film dispenser about a second axis that is substantially perpendicular to the first axis, and a control unit that controls the pre-stretcher unit. The control unit is configured to control the pre-stretcher unit such that during rotation of the bale, the amount of pre-stretching applied to the film alternates between a first elongation level and a second elongation level. The first elongation level is greater than the second elongation level, such that a part of the film that is pre-stretched at the second elongation level is positioned on a corner of the bale, and a part of the film that is pre-stretched at the first elongation level is positioned on an end face or a side surface of the bale.

16 Claims, 3 Drawing Sheets

(56) References Cited

U.S. PATENT DOCUMENTS

| | | | | |
|---|---|---|---|---|
| 4,387,552 A * | 6/1983 | Lancaster | ............ | A01F 15/071 53/211 |
| 4,458,467 A * | 7/1984 | Shulman | ............... | B65B 11/045 53/399 |
| 4,514,955 A * | 5/1985 | Mouser | ................. | B65B 11/045 53/211 |
| 4,676,048 A * | 6/1987 | Lancaster | ............ | B65B 11/008 53/210 |
| 4,706,443 A * | 11/1987 | Humphrey | ........... | B65B 11/045 53/556 |
| 4,712,686 A * | 12/1987 | Lancaster | ............ | A01F 15/071 206/597 |
| 4,840,006 A * | 6/1989 | Humphrey | ........... | B65B 11/045 53/556 |
| 4,866,909 A * | 9/1989 | Lancaster, III | ....... | B65B 11/008 53/399 |
| 4,953,336 A * | 9/1990 | Lancaster, III | ....... | B65B 11/008 53/176 |
| 5,042,225 A * | 8/1991 | Drury | .................. | A01F 15/071 53/211 |
| 5,765,344 A * | 6/1998 | Mandeville | ........... | B65B 11/025 53/389.3 |
| 5,816,026 A * | 10/1998 | Orpen | .................. | A01F 15/071 53/441 |
| 5,979,146 A * | 11/1999 | Orpen | ..................... | B65B 11/04 53/441 |
| 6,185,914 B1 * | 2/2001 | Mackie | ................. | B65B 11/045 53/556 |
| 6,253,532 B1 * | 7/2001 | Orpen | .................. | A01F 15/071 53/441 |
| 6,370,839 B1 * | 4/2002 | Nakagawa | ........... | B65B 11/008 52/211 |
| 9,493,262 B2 * | 11/2016 | Lancaster, III | ....... | B65B 11/025 |
| 10,005,580 B2 * | 6/2018 | Lancaster, III | ....... | B65B 11/025 |
| 2002/0174628 A1 * | 11/2002 | Lancaster, III | ....... | B65B 11/025 53/441 |
| 2004/0031238 A1 * | 2/2004 | Cox | ..................... | B65B 11/045 53/399 |
| 2006/0254214 A1 | 11/2006 | Cox et al. | | |
| 2007/0204564 A1 * | 9/2007 | Lancaster, III | ....... | B65B 11/006 53/399 |
| 2007/0204565 A1 | 9/2007 | Lancaster, III et al. | | |
| 2007/0209324 A1 | 9/2007 | Lancaster, III et al. | | |
| 2009/0094942 A1 * | 4/2009 | Cousins | ................ | B65B 11/045 53/441 |
| 2009/0178374 A1 * | 7/2009 | Lancaster, III | ......... | B65B 57/04 53/441 |
| 2009/0277136 A1 * | 11/2009 | Van Amstel | ........... | B65D 85/07 53/441 |
| 2009/0288372 A1 * | 11/2009 | Cere | ..................... | B65B 11/025 53/461 |
| 2010/0205910 A1 * | 8/2010 | Huyghe | ................. | B32B 27/08 53/441 |
| 2011/0146203 A1 | 6/2011 | Lancaster, III et al. | | |
| 2012/0031053 A1 | 2/2012 | Lancaster, III et al. | | |
| 2012/0124944 A1 | 5/2012 | Lancaster, III et al. | | |
| 2013/0076753 A1 * | 3/2013 | Lancaster, III | ....... | B65B 11/025 345/440 |
| 2014/0116008 A1 * | 5/2014 | Lancaster, III | ....... | B65B 11/025 53/461 |
| 2014/0223864 A1 * | 8/2014 | Lancaster, III | ......... | B65B 57/04 53/436 |
| 2015/0101281 A1 * | 4/2015 | Kudia | .................... | B65B 57/12 53/51 |
| 2017/0052075 A1 * | 2/2017 | Cere | ........................ | G01L 1/20 |
| 2017/0088301 A1 * | 3/2017 | Riemenschneider, III | .................. | B65B 59/003 |
| 2018/0079537 A1 * | 3/2018 | Lancaster, III | ....... | B65B 61/202 |
| 2018/0162660 A1 * | 6/2018 | Saylor | .................... | B65B 35/52 |
| 2018/0257802 A1 * | 9/2018 | Resch | ................... | B65B 11/045 |
| 2018/0273226 A1 * | 9/2018 | Lancaster, III | .... | B65D 71/0088 |
| 2019/0263603 A1 * | 8/2019 | Saylor | ..................... | B65B 11/00 |

FOREIGN PATENT DOCUMENTS

| | | | | |
|---|---|---|---|---|
| EP | 2156728 A2 * | 2/2010 | ........... | A01F 15/071 |
| GB | 2462840 A | 2/2010 | | |
| WO | WO 02/30751 A1 | 4/2002 | | |

* cited by examiner

BALE WRAPPER APPARATUS AND METHOD OF WRAPPING AN AGRICULTURAL BALE

BACKGROUND OF THE INVENTION

Field of the Invention

This invention applies to a bale wrapper apparatus and a method of applying stretch film wrapping to an agricultural bale.

In particular but not exclusively the invention relates to a method of applying stretch film wrapping to an agricultural bale using a bale wrapper apparatus which comprises: a bale-supporting table; a dispenser reel arrangement from which stretch film wrapping can be withdrawn to form successive overlapping windings of film which cover the bale; and means for applying relative rotation between the table and the dispenser reel arrangement during a wrapping cycle.

Description of the Related Art

It is known to provide bale wrappers to wrap agricultural bales e.g. cylindrical bales or bales of rectangular cross-section (also known respectively as "round bales" and "square bales"), and composed of hay, straw or only partly dried crop (such as wet grass) to form silage. Such apparatus, for example, can be of the rotating turntable type, rotating satellite arm type, or can be incorporated in integrated baler/wrapper apparatus. Bale wrappers of the rotating turntable and rotating satellite arm types are illustrated for example in FIGS. 6 and 5 of U.S. Pat. No. 5,327,706.

It is important to ensure, as far as possible, that the wrapping applied to the bale is under tension to envelope the bale, and in a substantially air- and water-tight manner to prevent ingress of atmospheric air and water to the bale, and egress of gases and liquids from the bale, particularly in the case of a wrapped crop which is fermenting to form silage. A typical wrapping cycle applies successive helical windings of pre-stretched film around the bale, while the latter is being rotated about its longitudinal axis, and to ensure that no lateral gaps are formed between adjacent windings (either during the wrapping process or during subsequent handling and storage of the wrapped bale), it is accepted practice that the relative speeds of rotation of the bale about its axis, and the linear speed of withdrawal of film from a film dispenser reel are set such that there is a substantial lateral overlap between successive windings (typically 50%).

A further problem in wrapping bales in a satisfactory manner arises in connection with the initial corner coverage of the outer surface of the bale (the term "corner" as used herein encompasses both edges and vertices, as found on round and square bales). For example, when wrapping a round bale there is often present in the outer surface of the bale outwardly projecting stalky material especially on the corners connecting the circular end faces to the cylindrical barrel side, which is liable to puncture at least the initial layers of overlapping film winding applied to the bale, and this can cause undesired leakage paths for water or gas. Similar problems arise with square bales, particularly on the vertices and on the edges that extend substantially perpendicular to the main longitudinal axis of the bale (the problem is generally less severe, although not negligible, on the edges that extend parallel to the main longitudinal axis). Furthermore, with conventional methods of applying overlapping windings of stretch film to bales, each successive layer also runs the risk of being punctured by the stalky material which has punctured the initial layer or layers and projects outwardly therefrom, forming a protruding point which is able to puncture further layers of wrapping.

The suppliers of stretchable plastics film for wrapping bales have to provide a product which can a) undergo pre-stretching prior to application to the bale without tearing or other damage; b) be applied under tension as successive helical windings around the bale also substantially without damage; c) subsequently adjust itself to the shape of the bale after wrapping is completed and without any unacceptable puncturing of the film by any spiky material present on the outer surface of the bale especially at the corners; and d) withstand any tearing or puncturing during subsequent handling of the wrapped bale e.g. discharge of the wrapped bale onto the ground, which may comprise remaining stubble following harvesting of the crop.

The manufacturers of bale wrapper apparatus, and the suppliers of the stretchable plastics film for wrapping bales with the apparatus, are constantly seeking to minimize consumption of film, for obvious reasons of economy, while at the same time seeking to ensure airtight wrapping of the bale, less risk of the film breaking, and to reduce the liability of the windings being punctured. It is particularly important to achieve improved airtight wrapping, as the quality of silage which is formed by fermentation within a wrapped bale can deteriorate rapidly when any gas exchange is allowed to take place with the ambient atmosphere. Bale wrapper apparatus normally apply helical windings of pre-stretched (polyethylene) film to the outer surface of the bale, but it is frequently the case that in practice the airtightness of the wrapped product is less than perfect. The gas can be exchanged by permeation through the film or through the overlap of the successive windings. Regarding the latter, the length of the path that the gas has to travel (transverse to the application direction) and through the overlaps of the windings on, for example, a four layer pattern (75 centimetre film which reduces to 60 centimetres after pre-stretching) is a minimum of 60 centimetres.

BRIEF SUMMARY OF THE INVENTION

The present invention relates generally to a bale wrapper apparatus for applying stretch film wrapping to an agricultural bale having an outer surface and a pair of opposed end faces, which comprises: a table for supporting the bale with its longitudinal axis extending substantially parallel to the ground, and for rotating the bale generally about this axis during a wrapping cycle; at least one holder arrangement for supporting a film dispenser arrangement to apply stretch film wrapping to cover the outer surface and the end faces of the bale, means for applying relative rotation between the table and the holder arrangement about a second axis extending substantially perpendicular to the longitudinal axis of the bale in order that successive windings of film can be applied to the bale.

A general objective of the present invention is to provide an improved method of wrapping, which provides better airtightness of a wrapped bale, while using the same amount of stretch film and/or alternatively which reduces the amount of film utilised to maintain the airtightness at current levels available, preferably while using, at least in part, existing bale wrapper apparatus and stretch film supplies.

A further preferred objective of the invention is to achieve these aims without reducing the puncture resistance for the stretched film positioned at the corners, and possibly even increasing the puncture resistance at the corners.

Normally, according to the state of the art, polyethylene film used to form helical windings applied to compressed bales is wound on dispenser reels of 500 or 750 millimetre length. Typical thickness of the film is 25 microns. Before being applied to the bale, the film is pre-stretched so that its length is elongated by about 60 to 70%. This means that the run length of film is extended to about 160 to 170% of its un-stretched length. Due to the stretching of the film lengthwise, this causes a consequent reduction of width of the film, and also a reduction in the thickness of the film to about 17 microns. This 17 micron thickness will however generally give sufficient puncture resistance at the corners.

The film strips are wound, usually helically onto the bales, and normally with a 50% overlap to the previous winding. Typically, four or six layers are applied to the surface of the bale. This results in a total thickness of overall film protection, provided by the successive windings, of about 70 to 100 microns.

Due to the permeability of the film, gas can permeate through an overall thickness of film of 70 to 100 microns. However, the thicker the overall layer, the less gas will be able to permeate through the overlying layers. Also, due to the presence of wrinkles and unevenness of the surface of the wrapping, gas will be exchanged by migration between the overlaps of successive windings.

When the strips of film are applied to a bale, stalks of material especially on the corners can puncture the first and possibly the successive layer(s) of film wound onto the bale. Such punctures can create a direct gas connection between the inside and the outside of the bale (when all layers are punctured); or shortcut the gas exchange through the overlaps of the windings when puncturing only the first layer(s). The surfaces of the cylindrical barrel side as well as the circular end faces of a round bale tend to incorporate substantially less stalky material than the corners.

Current wrapping techniques can provide reasonably reliable wrapping of bales, but often at the cost of over-usage of film. One attempt to optimise usage of film might be to consider using thinner films, but with the same number of overlying layers but less puncture resistance of individual layers.

A bale wrapping method is described in EP 2156728 A, in which a relatively high level of pre-stretching is applied to the wrapping film while the first layer of the bale wrapper is formed, and a relatively low level of pre-stretching is applied to the wrapping film while subsequent layers of the bale wrapping is formed. The high level of pre-stretching applied to the wrapping film while forming the first layer reduces the tension in the film as it is applied to the bale, thus reducing the risk of a puncture. The amount of pre-stretching is reduced while forming the subsequent layers of the wrapping, to increase the air-tightness of the wrapping. It should be noted that the amount of pre-stretching is adjusted only once during the wrapping process.

It is known that if the film is stretched substantially more than 70% the overall permeability of the film is hardly reduced, but the puncture resistance is reduced substantially.

The present invention therefore seeks to provide method and apparatus for improving the airtightness of wrapped bales (including both round bales and square bales), and/or at least to reduce the amount of film usage without decreasing the puncture resistance of the individual layers where applied on the corners of the bale as compared to current wrapping techniques.

According to one aspect of the invention there is provided a bale wrapper apparatus for applying stretch film wrapping to an agricultural bale having a pair of opposed end faces, at least one side surface, and at least one corner where the side surface meets an end face, the apparatus comprising a table for supporting the bale and rotating the bale about a first axis;

at least one film dispenser comprising a holder for a roll of stretch film and a pre-stretcher unit that is configured to pre-stretch the film and apply the pre-stretched film to a bale supported by the table; drive means for applying relative rotation between the table and the film dispenser about a second axis that extends substantially perpendicular to the first axis so that the pre-stretched film applied to the bale forms a bale wrapping that covers the side surface and the end faces of the bale, and a control unit that controls the pre-stretcher unit to adjust the amount of elongation applied by the pre-stretcher unit to the film, wherein the control unit is configured to control the pre-stretcher unit such that during at least one turn of relative rotation between the table and the film dispenser about the second axis, the amount of pre-stretching applied to the film alternates between a first elongation level and a second elongation level, wherein the first elongation level is greater than the second elongation level, such that a part of the film that is pre-stretched at the second elongation level is positioned on a corner of the bale, and a part of the film that is pre-stretched at the first elongation level is positioned on an end face or a side surface of the bale.

In the present invention, during at least one turn of relative rotation between the table and the film dispenser about the second axis, the amount of pre-stretching applied to the film alternates between a first elongation level and a second elongation level, wherein the first elongation level is greater than the second elongation level. The term "alternates" as used herein means that the amount of pre-stretching applied to the film changes repeatedly, (i.e. more than once) between a first elongation level and a second elongation level. Typically, for example, in the case of wrapping a round bale, during a single rotation of the bale relative to the film dispenser, the film may typically be pre-stretched four times at the lower second elongation level to reduce the elongation of the parts of the film that are placed on the four corners of the bale, and the film may be pre-stretched four times at the higher first elongation level to increase the elongation of the parts of the film that are placed on the two end faces and the two side surfaces of the bale.

It should be noted that the invention is therefore clearly distinguished from EP 2156728 A, in which the level of pre-stretching is changed only once during the entire wrapping process.

In an embodiment of a bale wrapper according to the invention, the elongation of the film alternates between a high level and a low level as the bale rotates. The parts of the film that have a low level of elongation are placed on the corners of the bale to reduce the risk of the film being punctured by stalky material, and the parts of the film that have a high level of elongation are placed on the end faces and the side surface or side surfaces of the bale, where the risk of puncture is much lower. This ensures economical usage of film and a high quality wrapping that has a low risk of puncture.

In an embodiment at least two parts of the film that are pre-stretched at the first elongation level are placed on the end faces of the bale during one turn of the table relative to the holder arrangement.

In an embodiment at least four parts of the film that are pre-stretched at the first elongation level are placed on the end faces and on the side surface (or side surfaces) of the bale during one turn of the table relative to the holder arrangement.

In an embodiment the parts of the film placed on the side surface (or side surfaces) of the bale have a reduced amount of pre-stretching compared to the parts of the film placed on the end faces of the bale. In this case the control unit may be configured to control the pre-stretcher unit so as to provide a third elongation level when applying film to the end faces of the bale, where the third elongation level is greater than the first elongation level and the second elongation level. This is because the end faces of the bale are generally covered with more layers of film than the side surfaces, owing to the way that the layers overlap one another as the bale is wrapped. The film applied to the end faces can therefore be stretched even more without the risk of puncturing.

The term "elongation level" as used herein means the amount that the film is pre-stretched by the pre-stretcher unit, measured as a percentage of the original film length. For example, if the film is stretched to twice its original length, this represents an elongation level of 200%.

In an embodiment the first elongation level is at least 1.3 times greater than the second elongation level, and preferably at least 1.5 times greater than the second elongation level.

In an embodiment a part of the film that is pre-stretched at the second elongation level is elongated by 150-170% from its original length.

In an embodiment a part of the film that is pre-stretched at the first elongation level is elongated by 170-400% from its original length.

In an embodiment the pre-stretcher unit includes a pair of stretcher rollers and at least one motor connected to the stretcher rollers, wherein the motor is configured to control the amount of pre-stretching applied to the film. The motor may be used to drive one of the rollers and a transmission (for example, gears, belts or a CVT) may be used to transfer drive from the first roller to the second roller. Alternative, separate motors may be provided for driving the two rollers individually.

In an embodiment the motor is also configured to control the application force of the film as the film is applied to the bale.

According to another aspect of the invention there is provided a method of wrapping an agricultural bale having a pair of opposed end faces, at least one side surface, and at least one corner where the at least one side surface meets an meets the end face, the method comprising: supporting the bale on a table and rotating the bale about a first axis; providing at least one film dispenser comprising a holder for a roll of stretch film and a pre-stretcher unit for pre-stretching the film, applying the pre-stretched film to a bale supported by the table; applying relative rotation between the table and the film dispenser about a second axis that extends substantially perpendicular to the first axis so as to form a bale wrapping that covers the side surface and the end faces of the bale, and controlling the amount of pre-stretching applied to the film such that during at least one turn of relative rotation between the table and the film dispenser, the amount of pre-stretching applied to the film alternates between a first elongation level and a second elongation level, wherein the first elongation level is greater than the second elongation level, and positioning a part of the film that is pre-stretched at the second elongation level on a corner of the bale and a part of the film that is pre-stretched at the first elongation level on an end face or a side surface of the bale.

In an embodiment the method includes positioning at least two parts of the film that are pre-stretched at the first elongation level on the end faces of the bale during one turn of the table relative to the holder arrangement.

In an embodiment the method includes positioning at least four parts of the film that are pre-stretched at the first elongation level on the end faces and on the side surface of the bale during one turn of the table relative to the holder arrangement.

In an embodiment the method includes the first elongation level is at least 1.3 times greater than the second elongation level, and preferably at least 1.5 times greater than the second elongation level.

In an embodiment a part of the film that is pre-stretched at the second elongation level is elongated by 150-170% from its original length.

In an embodiment a part of the film that is pre-stretched at the first elongation level is elongated by 170-400% from its original length.

In an embodiment the method includes controlling the amount of pre-stretching applied to the film by adjusting a drive force applied by motor connected to a pair of stretcher rollers in the pre-stretcher unit.

In an embodiment the method includes controlling the application force of the film as the film is applied to the bale by adjusting the drive force applied by the motor In another embodiment, the invention provides a method of applying stretch film wrapping to an agricultural bale using a bale wrapper apparatus which comprises: a table for supporting the bale with its longitudinal axis extending substantially parallel to the ground, and for rotating the bale generally about this axis during a wrapping cycle; at least one holder arrangement for supporting a film dispenser arrangement to apply stretch film wrapping to cover the outer surface and the end faces of the bale, said holder adapted to support a respective film dispenser and arranged to allow a length of film to be withdrawn from the dispensers and to be applied to the bale; means for applying relative rotation between the table and the holder arrangement about a second axis extending substantially perpendicular to the longitudinal axis of the bale in order that successive windings of film can be applied to the bale; a pre-stretcher unit arranged along the path of travel of film from the dispenser to the outer surface of the bale, and operative to engage the film and apply a pre-stretching to the film so that the latter undergoes elongation prior to application to the bale, whereby upon completion of the wrapping cycle the windings of film can tighten themselves onto the bale by release of some of the elastic energy stored in the pre-stretched film; and a control unit to control the amount of pre-stretching of the film strap in such a way that during one relative turn of the pre-stretcher relative to the bale at least during one part of the turn the pre-stretching applied to the film is substantially more than during the rest of the turn; wherein the part of the film that is pre-stretched substantially more is not to be positioned on the corners.

This gives optimum efficiency in usage of film, and/or improved puncture resistance at the corners.

According to another embodiment of the invention there is provided bale wrapper apparatus which comprises: a table for supporting the bale with its longitudinal axis extending substantially parallel to the ground, and for rotating the bale generally about this axis during a wrapping cycle; at least one holder arrangement for supporting a film dispenser arrangement to apply stretch film wrapping to cover the outer surface and the end faces of the bale, said holder adapted to support a respective film dispenser and arranged to allow a length of film to be withdrawn from the dispensers and to be applied to the bale; means for applying relative rotation between the table and the holder arrangement about a second axis extending substantially perpendicular to the longitudinal axis of the bale in order that successive windings of film can be applied to the bale; a pre-stretcher unit arranged along the path of travel of film from the dispenser to the outer surface of the bale, and operative to engage the film and apply a pre-stretching to the film so that the latter undergoes elongation prior to application to the bale, whereby upon completion of the wrapping cycle the windings of film can tighten themselves onto the bale by release of some of the elastic energy stored in the pre-stretched film; and a control unit that is configured to control the amount of pre-stretching of the film strap in such a way that during a half turn of the bale around its main axis, preferably during one relative turn of the pre-stretcher relative to the bale, at least during one part of the turn the amount of pre-stretching applied to the film is substantially more than during the rest of the turn; and wherein the part of the film that is pre-stretched substantially less is positioned on the corners.

The pre-stretcher preferably comprises two spaced-apart rollers around which the film passes, which rotate at different circumferential speeds to stretch the film. The film strip is withdrawn from the dispenser reel, and passed through the pre-stretcher unit, under the action of a so-called "application force" generated by the relative rotation about the second axis, and rotation of the bale about its axis by the table. As mentioned above, the passage of the film strip through the pre-stretcher unit causes elongation of the film prior to application of the film strip as successive overlapping windings on the bale. In this way, successive layers of coverage of film are applied to the bale.

The difference in the pre-stretching could be achieved by setting the correct speed by at least one speed and/or torque controlled motor(s) connected to the rollers and/or by controlling the circumferential speed of the rollers by connecting them to different gear sets during relative rotation of the stretching unit around the bale. Alternatively, the stretching unit could be fixed and the bale mounted on a rotatable turntable to provide relative rotation of the bale and the stretching unit.

BRIEF DESCRIPTION OF THE SEVERAL VIEWS OF THE DRAWINGS

Preferred embodiments of the invention will now be described in detail, by way of example only, with reference to the accompanying drawings, in which.

DETAILED DESCRIPTION OF THE INVENTION

Figure 1:
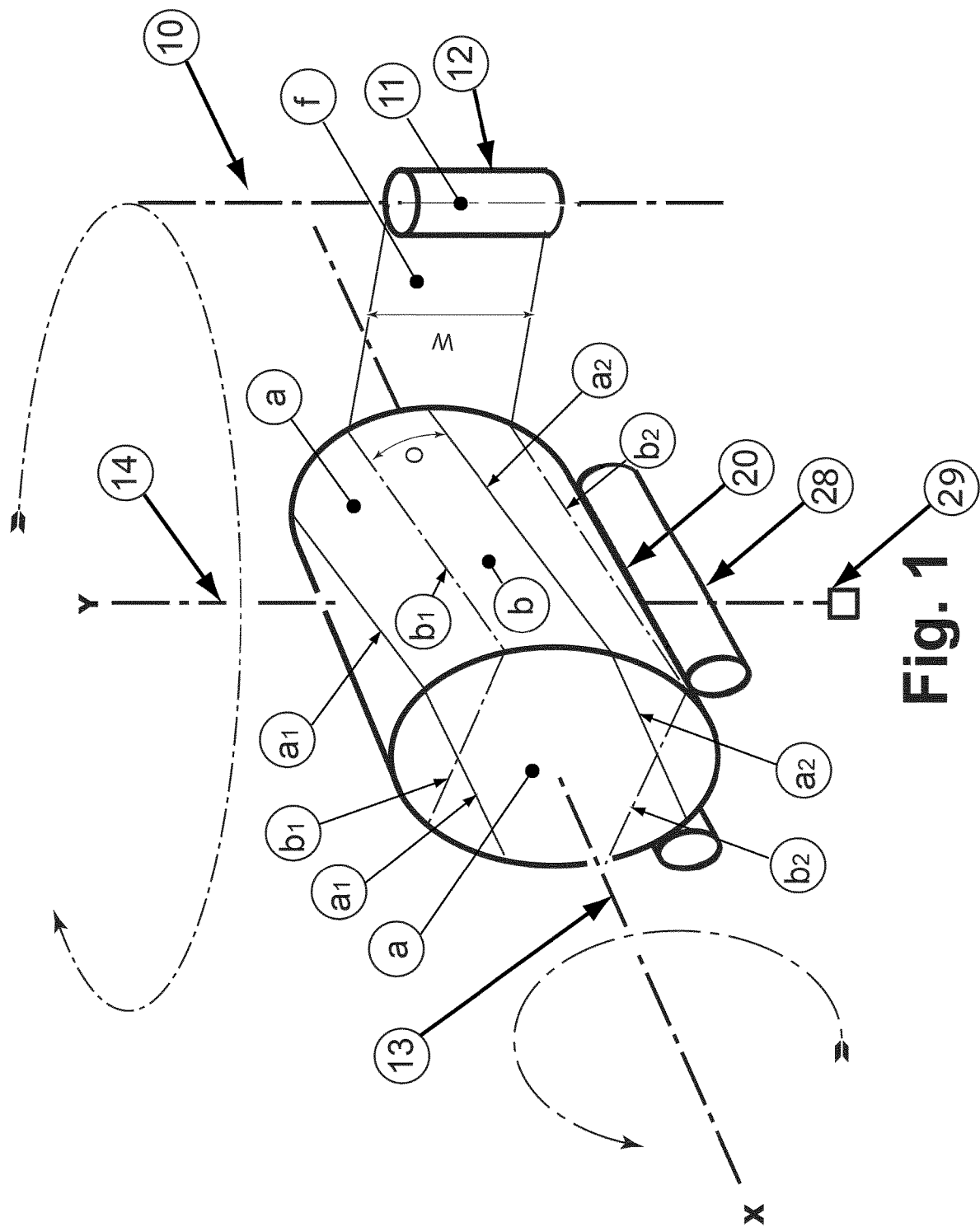
FIG. 1 is a schematic perspective illustration showing the general known concept of a bale wrapper to which the invention may be applied, by way of background to the description of the preferred embodiment.

Referring first to FIG. 1, the general concept of wrapping of an agricultural bale will first be described, to form background to the description of the preferred embodiment of the invention.

A bale wrapper apparatus is designated generally by reference 10, and is of the rotating satellite dispenser type. At least one film holder 11 is mounted on one end of a rotating arm (not shown) to rotate about Y axis. A dispenser reel 12 is mounted on the holder 11, and a length of stretch film f is withdrawn from the reel 12 to form successive overlapping windings a, b of stretch film around the cylindrical outer surface 22, and the opposed circular end faces 24 of a rotating cylindrical bale 20. It will be noted that each winding a, b of stretch film passes around the corners 26 of the bale, where the cylindrical outer surface 22 meets each of the opposed circular end faces 24. The edges of the successive overlapping windings a, b of stretch film are indicated by references $a_1$ $a_2$ $b_1$ and $b_2$.

A table 28 (not shown in detail) is provided to support the agricultural bale 20 with its longitudinal axis X extending substantially parallel to the ground (when the apparatus is standing on level ground) and forming a first axis 13 about which the bale 20 is rotatable during a wrapping cycle. The table 29 may comprise a pair of rollers, which are rotatable to rotate the bale 20, and may for example be similar to that shown in FIG. 5 of U.S. Pat. No. 5,327,706. During a wrapping cycle, a drive motor 29 drives the rollers and causes the table 28 to rotate about the first axis 13, while simultaneously the film dispenser reel 12 is caused to orbit in a substantially horizontal plane about vertical axis Y, which forms a second axis 14.

This is one preferred form of bale wrapper apparatus to which the invention may be applied, but it should be understood that the general concept of the invention is also applicable to bale wrapper apparatus of the rotating turntable type, for example as shown in FIG. 6 of U.S. Pat. No. 5,327,706; and also to apparatus having a rotatable ring carrying one or more film dispensers, as referred to above. Furthermore, the invention is applicable to the wrapping of square bales as well as round bales.

The above description with reference to FIG. 1 is intended to explain the background to the description of certain preferred aspects and examples of bale wrappers and bale wrapping methods and techniques according to the invention, which will now be described by way of example with reference to FIGS. 2-4.

Figure 2:
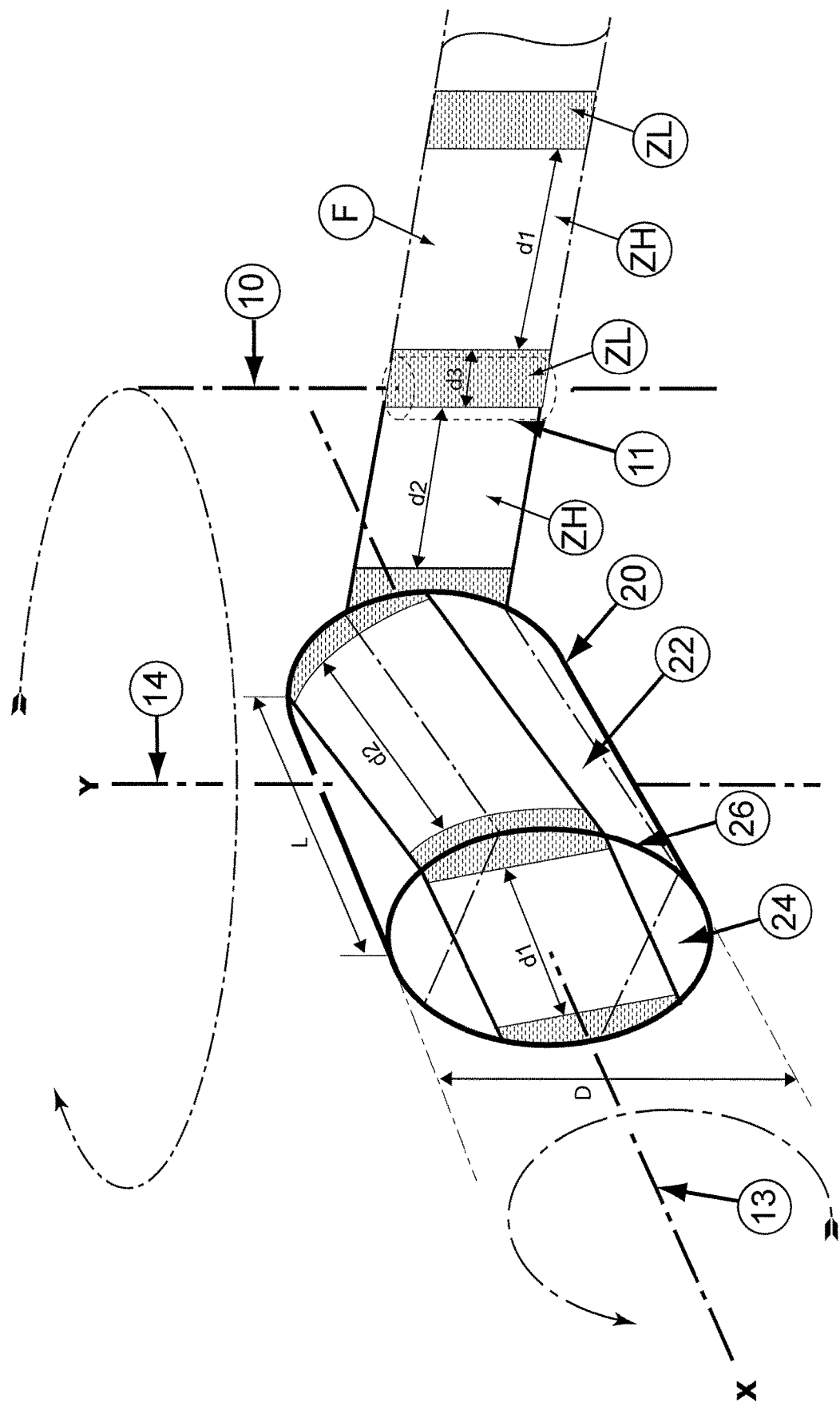
FIG. 2 illustrates a method of applying stretch film wrapping to an agricultural bale according to an embodiment of the invention.

Some basic principles of a bale wrapping method according to an embodiment of the invention are illustrated in FIG. 2. In this example, a method of wrapping a round bale is illustrated, wherein the bale 20 comprises a cylindrical surface 22 and two circular end faces 24, with corners 26 where the cylindrical surface 22 meets the circular end faces 24. As described above, a length of stretch film f is wrapped onto the surface of the bale 20 to form successive overlapping windings by rotating the bale 20 about the first axis 13 while simultaneously rotating a film holder 11 about the second axis 14. A pre-stretching apparatus (not shown) is associated with the holder 11 applies a pre-stretch to the film f before it is applied to the bale, so that the film forms a tight wrapping layer around the bale. This is all conventional.

Where the present invention differs from the conventional bale wrapping method described above is in the fact that the pre-stretching apparatus associated with the holder is configured to adjust the degree of pre-stretch applied to the film f as it is applied to the bale 20 so as to form alternating high stretch zones ZH in which the film has a first elongation level, and low stretch zones ZL in which the film has a second elongation level, where the first elongation level is greater than the second elongation level. In FIG. 2 the high stretch zones ZH are shown with a white background colour, and the low stretch zones ZL are shown with a stippled background. The low stretch zones ZL are spaced apart so that when the film f is applied to the surface of the bale 20 the low stretch zones ZL are positioned over the corners 26 of the bale 20, whereas the high stretch zones ZH are positioned over the cylindrical surface 22 and the two circular end faces 24 of the bale 20.

Typically, a part of the film that is pre-stretched at the first elongation level will be elongated by 170-400% from its original length, and a part of the film that is pre-stretched at the second elongation level will be elongated by 150-170% from its original length. The first elongation level is preferably at least 1.3 times greater than the second elongation level, and is more preferably at least 1.5 times greater than the second elongation level. As an example, if the first elongation level is 320% and the second elongation level is 160%, the first elongation level will be 2 times greater than the second elongation.

If the length L of the bale 20 is not equal to the diameter D of the bale, the high stretch zones ZH may have two alternative lengths, d1 and d2, which are related respectively to the diameter D and the length L of the bale 20, so that the low stretch zones ZL are positioned correctly over the corners 26 of the bale 20. For example, if each low stretch zone ZL has a length d3, then L=d2+d3 and D=d1+d3.

Preferably, the film is stretched over a short distance between two stretch rollers, with different circumferential speeds, so as to prevent the film from over-stretching on weaker spots in the run length of the film between the film dispenser and the bale.

Figure 4:
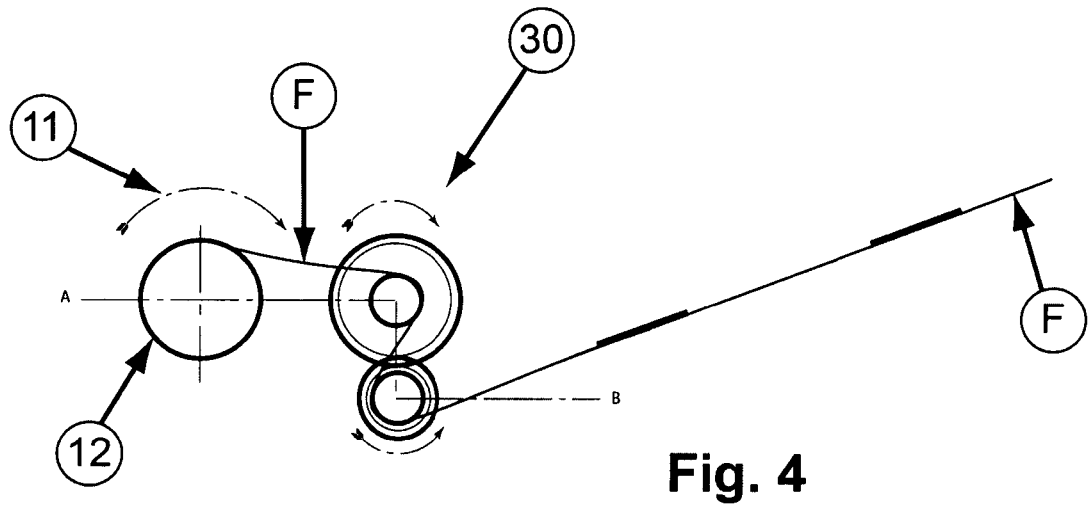
FIG. 4 is a top plan view of the film dispenser apparatus shown in FIG. 4.
Figure 3:
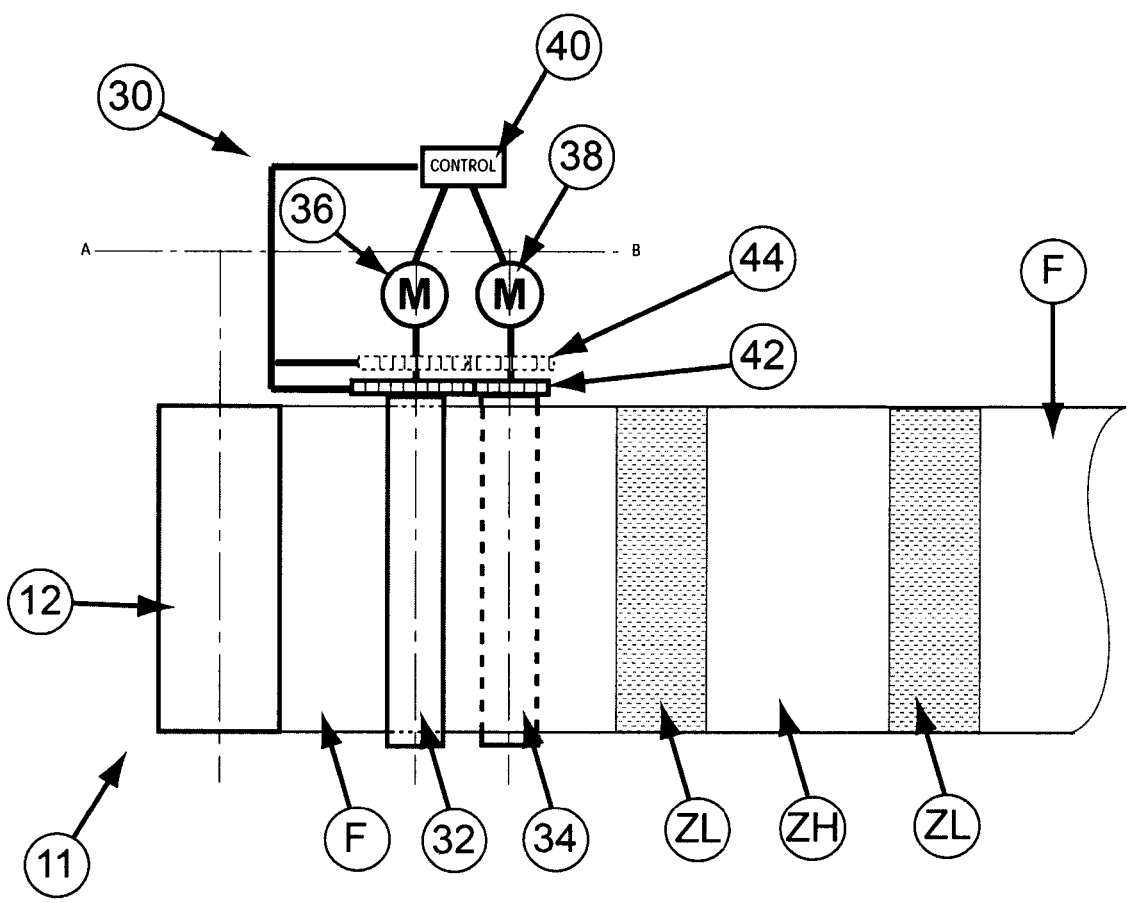
FIG. 3 is a view of a film dispenser apparatus that includes a pre-stretcher unit, taken on line A-B of FIG. 3.

An example of a pre-stretching apparatus 30 that applies a pre-stretch to the film f before it is applied to the bale 20 is illustrated in FIGS. 3 and 4. The pre-stretching apparatus 30 is associated with the film holder 11 and stretches the film f after it has been pulled from the dispenser reel 12 and before it is applied to the surface of the bale. The pre-stretching apparatus 30 includes first and second counter-rotating rolls 32, 34 around which the film f passes. The second roll 34 is configured to rotate with a higher circumferential speed than the first roll 32 so as to apply a specified pre-stretch the film f.

The relative speeds of the first and second rolls 32, 34 may be controlled in a number of different ways. For example, each roll 32, 34 may be driven by a separate drive motor 36, 38 that is controlled individually by a controller 40. The controller 40 is configured to adjust the relative speeds of the motors 36, 38 so as to apply a higher or lower degree of pre-stretch to the film f, thereby forming alternating high stretch zones ZH and low stretch zones ZL. Alternatively, for example, the rolls may be connected to one another by first and second gear trains 42, 44 having different gear ratios, wherein one of the rolls (for example the first roll 32) is optionally configured to be driven by a motor 36 (or any other drive input) and the other roll (for example the second roll 34) is configured to be driven through one or other of the gear trains 42, 44. The controller 40 then controls which of the two gear trains 42, 44 is engaged, via respective clutches, thereby controlling the degree of pre-stretch applied to the film f. Alternatively, a continuously variable transmission (CVT) may be used to transfer drive between the rollers and to adjust the relative rotational speeds of the rollers.

From tests it can be seen that due to the higher stretch level, film applied to the bale shows less wrinkles and therefore has less gas exchange through the overlaps. Further, these tests show that less air is trapped between the layers than when the bale is wrapped traditionally. Less trapped air between the layers leads to a better connection between the layers, and therefore better airtightness. Also, this results in fewer problems when the bale is grabbed with a clamping device for handling, since there will be a reduced risk, or no risk, of trapped air bursting the outer layers of film as the clamping device squeezes the bale.

Also tests show that stretching the film to a higher level does not substantially reduce the overall permeability through the film. Therefore the permeation of gasses will not substantially decrease at the areas where the ZL zones are placed on the bale. And since the bale does not incorporate stalky material at the spots where the ZL zones are placed the risk of punctures is not substantially increased.

The invention claimed is:

1. A bale wrapper apparatus for applying stretch film wrapping to an agricultural bale having a pair of opposed end faces, at least one side surface, and at least one corner where the side surface meets an end face, the apparatus comprising:
   a table for supporting the bale and rotating the bale about a first axis;
   at least one film dispenser comprising a holder for a roll of stretch film and a pre-stretcher unit that is configured to pre-stretch the film and apply the pre-stretched film to a bale supported by the table, wherein the pre-stretcher unit includes a pair of stretcher rollers and at least one motor connected to the stretcher rollers, wherein the at least one motor is configured to drive rotation of the stretcher rollers to pre-stretch the film;
   drive means for applying relative rotation between the table and the film dispenser about a second axis that extends substantially perpendicular to the first axis so that the pre-stretched film applied to the bale forms a bale wrapping that covers the side surface and the end faces of the bale; and
   a control unit that controls the pre-stretcher unit to adjust the amount of elongation applied by the pre-stretcher unit to the film by adjusting relative speeds of rotation of the stretcher rollers,
   wherein the control unit is configured to control the pre-stretcher unit such that during one single turn of relative rotation between the table and the film dispenser about the second axis, the amount of pre-stretching applied to the film changes repeatedly between a first elongation level and a second elongation level, wherein the first elongation level is greater than the second elongation level, and wherein the control unit is configured to control the pre-stretcher unit such that a part of the film that is to be positioned on a corner of the bale is pre-stretched at the second elongation level, and a part of the film that is to be positioned on an end face or a side surface of the bale is pre-stretched at the first elongation level.

2. The bale wrapper apparatus according to claim 1, wherein at least two parts of the film that are pre-stretched at the first elongation level are placed on the end faces of the bale during one turn of the table relative to the holder.

3. The bale wrapper apparatus according to claim 1, wherein at least four parts of the film that are pre-stretched at the first elongation level are placed on the end faces and on the side surface of the bale during one turn of the table relative to the holder.

4. The bale wrapper apparatus according to claim 1, wherein the parts of the film placed on the side surface of the bale have a reduced amount of pre-stretching compared to the parts of the film placed on the end faces of the bale.

5. The bale wrapper apparatus according to claim 1, wherein the first elongation level is at least 1.3 times greater than the second elongation level.

6. The bale wrapper apparatus according to claim 1, wherein a part of the film that is pre-stretched at the second elongation level is elongated by 150-170% from its original length.

7. The bale wrapper apparatus according to claim 1, wherein a part of the film that is pre-stretched at the first elongation level is elongated by 170-400% from its original length.

8. The bale wrapper apparatus according to claim 1, wherein the at least one motor is also configured to control the application force of the film as the film is applied to the bale.

9. A method of wrapping an agricultural bale having a pair of opposed end faces, at least one side surface, and at least one corner where a side surface meets an end face, the method comprising:
  supporting the bale on a table and rotating the bale about a first axis;
  providing at least one film dispenser comprising a holder for a roll of stretch film and a pre-stretcher unit for pre-stretching the film, wherein the pre-stretcher unit includes a pair of stretcher rollers and at least one motor that drives rotation of the stretcher rollers to pre-stretch the film;
  applying the pre-stretched film to a bale supported by the table;
  applying relative rotation between the table and the film dispenser about a second axis that extends substantially perpendicular to the first axis so as to foils a bale wrapping that covers the side surface and the end faces of the bale;
  controlling the amount of pre-stretching applied to the film by adjusting relative speeds of rotation of the stretcher rollers such that during one single turn of relative rotation between the table and the film dispenser, the amount of pre-stretching applied to the film changes repeatedly between a first elongation level and a second elongation level, wherein the first elongation level is greater than the second elongation level; and
  controlling the amount of pre-stretching such that a part of the film that is to be positioned on a corner of the bale is pre-stretched at the second elongation level and a part of the film that is to be positioned on an end face or a side surface of the bale is pre-stretched at the first elongation level.

10. The method according to claim 9, including positioning at least two parts of the film that are pre-stretched at the first elongation level on the end faces of the bale during one turn of the table relative to the holder.

11. The method according to claim 9, including positioning at least four parts of the film that are pre-stretched at the first elongation level on the end faces and on the side surface of the bale during one turn of the table relative to the holder.

12. The method according to claim 9, wherein the first elongation level is at least 1.3 times greater than the second elongation level.

13. The method according to claim 9, wherein a part of the film that is pre-stretched at the second elongation level is elongated by 150-170% from its original length.

14. The method according to claim 9, wherein a part of the film that is pre-stretched at the first elongation level is elongated by 170-400% from its original length.

15. The method according to claim 9, including controlling the amount of pre-stretching applied to the film by adjusting a drive force applied by the motor connected to the stretcher rollers.

16. The method according to claim 15, including controlling the application force of the film as the film is applied to the bale by adjusting the drive force applied by the motor.

* * * * *